US010592285B2

(12) United States Patent
Beckett et al.

(10) Patent No.: US 10,592,285 B2
(45) Date of Patent: Mar. 17, 2020

(54) SYSTEM AND METHOD FOR INFORMATION HANDLING SYSTEM INPUT/OUTPUT RESOURCE MANAGEMENT (71) Applicant: DELL PRODUCTS, LP, Round Rock, TX (US)

(72) Inventors: John C. Beckett, Georgetown, TX (US); Robert W. Hormuth, Cedar Park, TX (US)

(73) Assignee: Dell Products, LP, Round Rock, TX (US)

( * ) Notice: Subject to any disclaimer, the term of this patent is extended or adjusted under 35 U.S.C. 154(b) by 134 days.

(21) Appl. No.: 15/610,218

(22) Filed: May 31, 2017

(65) Prior Publication Data
US 2018/0349188 A1 Dec. 6, 2018

(51) Int. Cl.
*G06F 13/42* (2006.01)
*G06F 9/50* (2006.01)
*G06F 9/4401* (2018.01)
*G06F 21/57* (2013.01)

(52) U.S. Cl.
CPC .............. *G06F 9/50* (2013.01); *G06F 9/4401* (2013.01); *G06F 13/4282* (2013.01); *G06F 21/572* (2013.01); *G06F 21/575* (2013.01); *G06F 2213/0026* (2013.01)

(58) Field of Classification Search
None
See application file for complete search history.

(56) References Cited

U.S. PATENT DOCUMENTS

| 8,645,747 | B2 | 2/2014 | Buckland et al. | |
| 2007/0186025 | A1* | 8/2007 | Boyd | G06F 9/5077 710/305 |
| 2008/0159321 | A1 | 7/2008 | Rispoli et al. | |
| 2012/0166582 | A1* | 6/2012 | Binder | H04L 63/18 709/217 |
| 2017/0070363 | A1* | 3/2017 | Watkins | H04L 12/423 |

OTHER PUBLICATIONS

"Performance Tuning Guidelines for Mellanox Network Adapters," Rev. 1.17, Document No. 3368, Mellanox Technologies, 2016, pp. 1-30.

* cited by examiner

*Primary Examiner* — Scott C Sun
(74) *Attorney, Agent, or Firm* — Larson Newman, LLP (57) ABSTRACT An information handling system includes a processor complex with a root complex that provides N serial data lanes, where N is an integer. The information handling system also includes boot process logic that determines that a device is coupled to X of the serial data lanes, where X is an integer less than N, determines that no device is coupled to Y of the serial data lanes, where Y is an integer less than or equal to N−X, and allocates a portion of bus resources of the root complex to the device, the portion being greater (X+Y)/N.

20 Claims, 6 Drawing Sheets

SYSTEM AND METHOD FOR INFORMATION HANDLING SYSTEM INPUT/OUTPUT RESOURCE MANAGEMENT

FIELD OF THE DISCLOSURE

This disclosure generally relates to information handling systems, and more particularly relates to input/output resource management.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a processor complex with a root complex that provides N serial data lanes, where N is an integer. The information handling system may also include boot process logic that can determine that a device is coupled to X of the serial data lanes, where X is an integer less than N, determine that no device is coupled to Y of the serial data lanes, where Y is an integer less than or equal to N−X, and allocate a portion of bus resources of the root complex to the device, the portion being greater (X+Y)/N.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
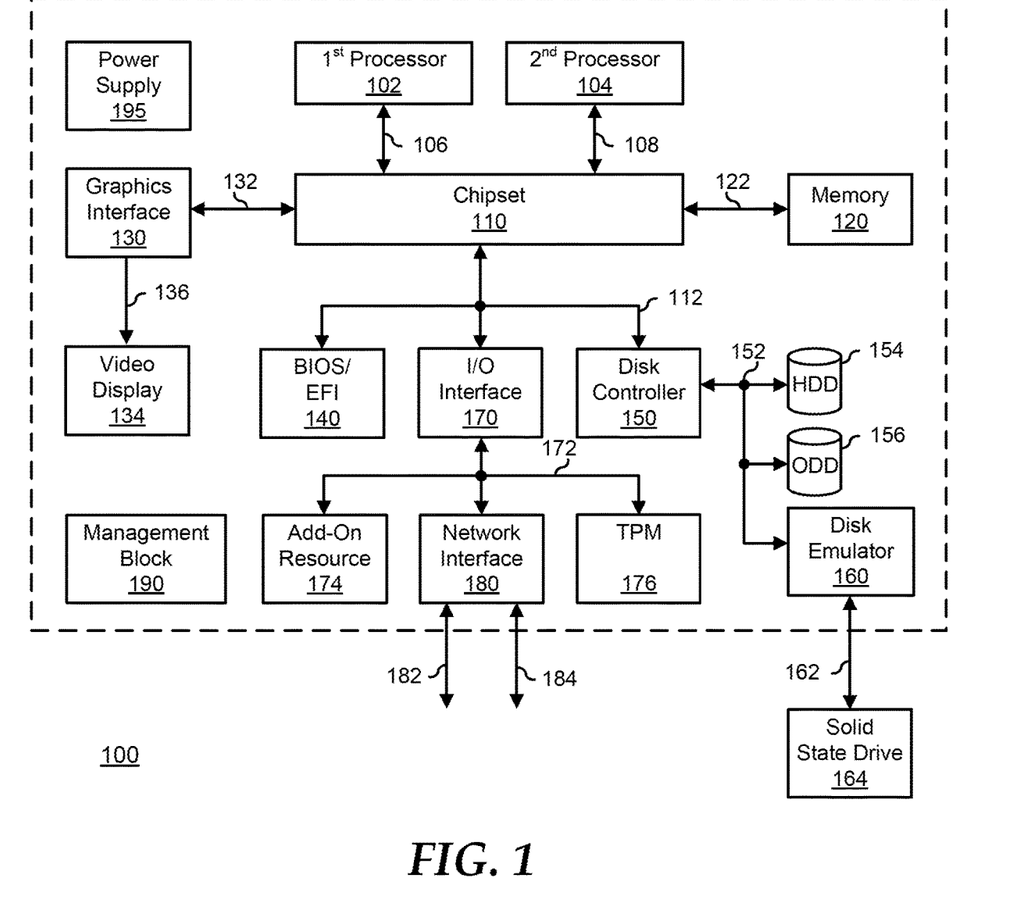
FIG. 1 is a block diagram illustrating a generalized information handling system according to an embodiment of the present disclosure.

FIG. 1 illustrates a generalized embodiment of an information handling system 100. For purpose of this disclosure information handling system 100 can be configured to provide the features and to perform the functions of the OPF system as described herein. Information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described below, and operates to perform one or more of the methods described below. Information handling system 100 includes a processors 102 and 104, a chipset 110, a memory 120, a graphics interface 130, a basic input and output system/extensible firmware interface (BIOS/EFI) module 140, a disk controller 150, a hard disk drive (HDD) 154, an optical disk drive (ODD) 156, a disk emulator 160 connected to an external solid state drive (SSD) 162, an input/output (I/O) interface 170, one or more add-on resources 174, a trusted platform module (TPM) 176, a network interface 180, a management block 190, and a power supply 195. Processors 102 and 104, chipset 110, memory 120, graphics interface 130, BIOS/EFI module 140, disk controller 150, HDD 154, ODD 156, disk emulator 160, SSD 162, I/O interface 170, add-on resources 174, TPM 176, and network interface 180 operate together to provide a host environment of information handling system 100 that operates to provide the data processing functionality of the information handling system. The host environment operates to execute machine-executable code, including platform BIOS/EFI code, device firmware, operating system code, applications, programs, and the like, to perform the data processing tasks associated with information handling system 100.

In the host environment, processor 102 is connected to chipset 110 via processor interface 106, and processor 104 is connected to the chipset via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disk controller to HDD 154, to ODD 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Management block 190 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 100. In particular, management block 190 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 100, such as system cooling fans and power supplies. Management block 190 can include a network connection to an external management system, and the management block can communicate with the management system to report status information for information handling system 100, to receive BIOS/UEFI or system firmware updates, or to perform other task for managing and controlling the operation of information handling system 100. Management block 190 can operate off of a separate power plane from the components of the host environment so that the management block receives power to manage information handling system 100 when the information handling system is otherwise shut down. An example of management block 190 may include a commercially available BMC product that operates in accordance with an Intelligent Platform Management Initiative (IPMI) specification, such as a Integrated Dell Remote Access Controller (iDRAC), or the like. Management block 190 may further include associated memory devices, logic devices, security devices, or the like, as needed or desired.

Power supply 195 represents one or more devices for power distribution to the components of information handling system 100. In particular, power supply 195 can include a main power supply that receives power from an input power source, such as a wall power outlet, a power strip, a battery, or another power source, as needed or desired. Here, power source 195 operates to convert the power at a first voltage level from the input power source to one or more power rails that are utilized by the components of information handling system. Power supply 195 can also include one or more voltage regulators (VRs) that each receive power from the main power supply and that operate to convert the input voltage to an output voltage that is used by one or more components of information handling system. For example, a VR can be provided for each of processors 102 and 104, and another VR can be provided for memory 120. Power supply 195 can be configured to provide a first power plane that provides power to the host environment, and to provide a second power plane that provides power to the management environment.

Figure 2:
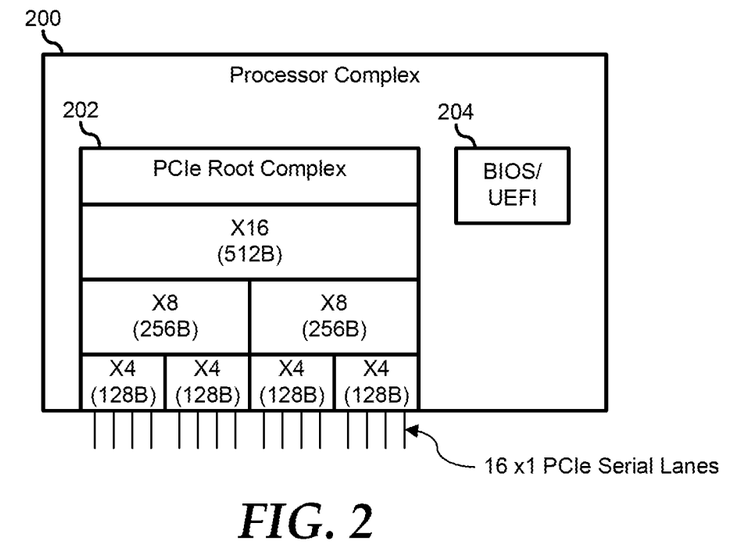
FIG. 2 is a block diagram illustrating a processor complex according to an embodiment of the present disclosure.

FIG. 2 illustrates a processor complex 200, such as may be included in information handling system 100. Processor complex 200 includes a Peripheral Component Interconnect Express (PCIe) root complex 202 and a Basic Input/Output System/Universal Extensible Firmware Interface (BIOS/UEFI) 204. Processor complex 200 provides data processing functionality of an information handling system. As such, processor complex 200 represents a data processing apparatus, such as one or more central processing units (CPUs) or processor cores, and the associated data input and output I/O functionality, such as a chipset component, and other I/O processor components. Processor complex 200 operates to execute machine-executable code to perform the data processing tasks associated with an information handling system.

PCIe root complex 202 represents a logical and physical interface structure between one or more CPUs of processor complex 200 and sixteen (16) lanes of PCIe interfaces. The sixteen (16) lanes of PCIe interfaces may each represent bi-directional serial interface lanes in accordance with the PCI Express Standard, Version 4.0, such that each serial interface lane provides up to a 2 gigabytes per second (GB/s) data transfer rate. The sixteen lanes of PCIe interfaces may be physically configured in a particular information handling system as sixteen separate one-lane (x1) PCIe interfaces, as eight separate two-lane (x2) PCIe interfaces, as four separate four-lane (x4) PCIe interfaces, as two separate eight-lane (x8) PCIe interfaces, or as a single sixteen-lane (x16) PCIe interface. Typically, such physically configured interfaces will be connected either to other PCIe devices of similar lane configurations, or to PCIe add-in card connectors that support add-in cards with PCIe devices of similar lane configurations. That is, if a particular information handling system is designed such that the sixteen (16) lanes of PCIe interfaces are configured as four x4 PCIe interfaces, then each x4 PCIe interface will typically be connected either to a x4 PCIe endpoint device, or to a x4 PCIe add-in card connector. PCIe devices include PCIe switches, PCIe bridges, or PCIe endpoint devices. An example of a PCIe endpoint device includes a network interface device such as a Fibre Channel, Infiniband, or Ethernet adapter, a memory controller such as a RAID controller, a Graphics Processing Unit (GPU), a PCIe-to-PCI or PCIe-to-PCI-X bridge, or another type of PCIe endpoint device, as needed or desired.

PCIe root complex 202 includes 512 bytes of storage space, such as register space within the hardware of the PCIe root complex, or such as memory space of a memory device of processor complex 200, for use as a completion buffer space for the PCIe interfaces. The 512 bytes are allocated equally between the separate PCIe interfaces. Thus if PCIe root complex 202 is configured as a single x16 PCIe interface, then the x16 PCIe interface is allocated the entire 512 bytes as its completion buffer space. Similarly, if PCIe root complex 202 is configured as two x8 PCIe interfaces, then each x8 PCIe interface is allocated a separate 256 bytes of the 512 bytes as its completion buffer space. Likewise, each of four x4 PCIe interfaces is allocated a separate 128 bytes as its completion buffer space.

PCIe root complex 202 further supports sixteen outstanding non-posted request instances, that is, requests for which a reply is expected. The sixteen outstanding non-posted request instances are evenly allocated among the PCIe interfaces. Thus a single x16 PCIe interface supports sixteen outstanding non-posted request instances, while each of two x8 PCIe interfaces support eight outstanding non-posted request instances, and each of four x4 PCIe interfaces support four outstanding non-posted request instances.

During a system boot process, BIOS/UEFI 204 performs various processing tasks to enumerate PCIe root complex 202 to determine the configuration of the PCIe root complex, to discover the topology of the PCIe devices connected to the PCIe root complex, and to ascribe a hierarchy to the PCIe interfaces, to the PCIe devices, and to any functions of the PCIe devices. The hierarchy includes bus numbers for the PCIe interfaces and any PCI or PCI-X interfaces discovered in the topology, device numbers for the devices in the topology, and function numbers for each function of the devices. In determining the configuration of PCIe root complex 202, BIOS/UEFI 204 operates to allocate the completion buffer space and the outstanding non-posted request instances to the instantiated PCIe interfaces. For example, if processor complex 200 is configured to instantiate four x4 PCIe interfaces, then BIOS/UEFI 204 allocates 128 bytes of the 512 bytes of completion buffer space, and four of the available outstanding non-posted request instances, to each x4 PCIe interface. The details of enumeration of PCIe root complex 202 are well known in the art and will not be further discussed herein, except as needed to illustrate the present disclosure.

Note that, as illustrated, PCIe root complex 202 is only shown as being configurable as a x16 PCIe interface, as two x8 PCIe interfaces, or as four x4 PCIe interfaces, but this is to simplify the description, and should not be understood as precluding x2 and x1 PCIe interface configurations. It will be further understood that processor complex 200 may include one or more additional PCIe root complexes similar to PCIe root complex 202, and that may be configured similarly to PCIe root complex 202, or may be configured differently from PCIe root complex 202, as needed or desired.

Figure 3:
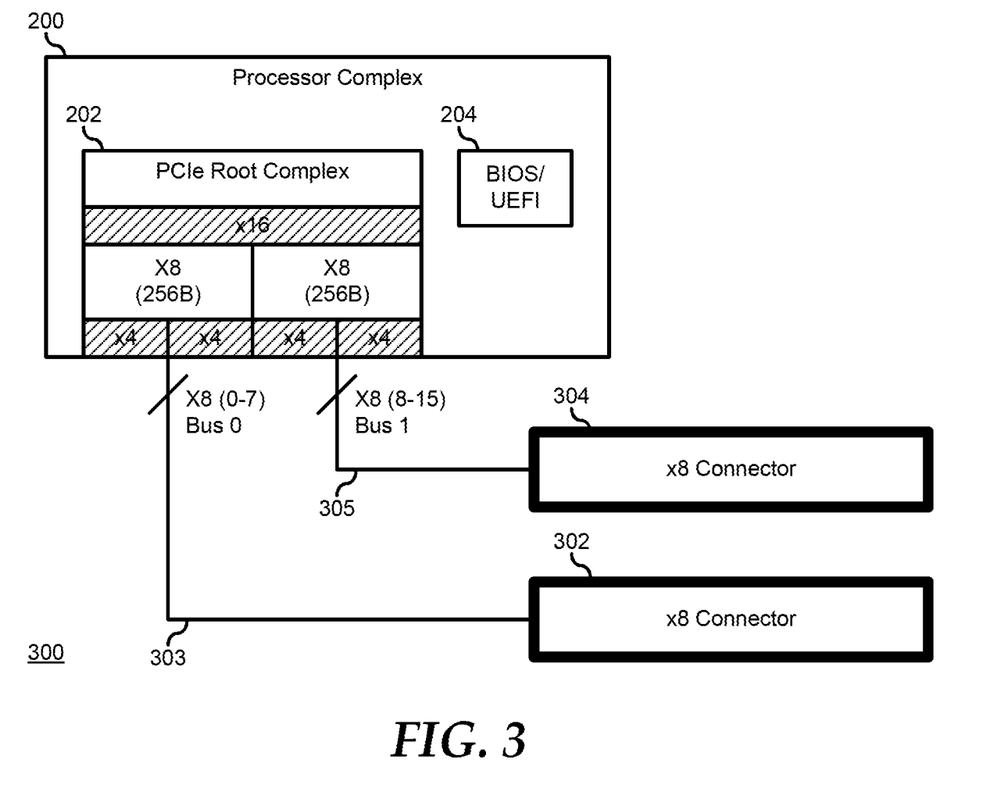
FIG. 3 is a block diagram illustrating an information handling system including the processor complex of FIG. 2.

FIG. 3 illustrates an information handling system 300 including processor complex 200, a first x8 PCIe connector 302 connected to PCIe root port 202 via a first x8 PCIe interface 303 (lanes 0-7), and second x8 PCIe connector 304 connected to the PCIe root port via a second x8 PCIe interface 305 (lanes 8-15). As illustrated, connectors 302 and 304 are not populated with PCIe add-in cards. Here, during a system boot process, BIOS/UEFI 204 enumerates PCIe root complex 202, determining that the PCIe root complex is configured as two x8 PCIe interfaces 303 and 305. Thus BIOS/UEFI 204 ascribes PCIe interface 303 as "Bus 0," and ascribes PCIe interface 305 as "Bus 1." Further, BIOS/UEFI 204 determines that no PCIe add-in cards are populated in PCIe connectors 302 and 304, and so the BIOS/UEFI ascribes no device or function numbers to the PCIe hierarchy of information handling system 300. BIOS/UEFI 204 allocates the 512 bytes of completion buffer space between the PCIe interfaces 303 and 305, such that each PCIe interface is configured with 256 bytes of completion buffer space. Similarly, BIOS/UEFI 204 allocates the sixteen outstanding non-posted request instances among PCIe interfaces 303 and 305, such that each PCIe interface is configured to support eight outstanding non-posted request instances.

Figure 4:
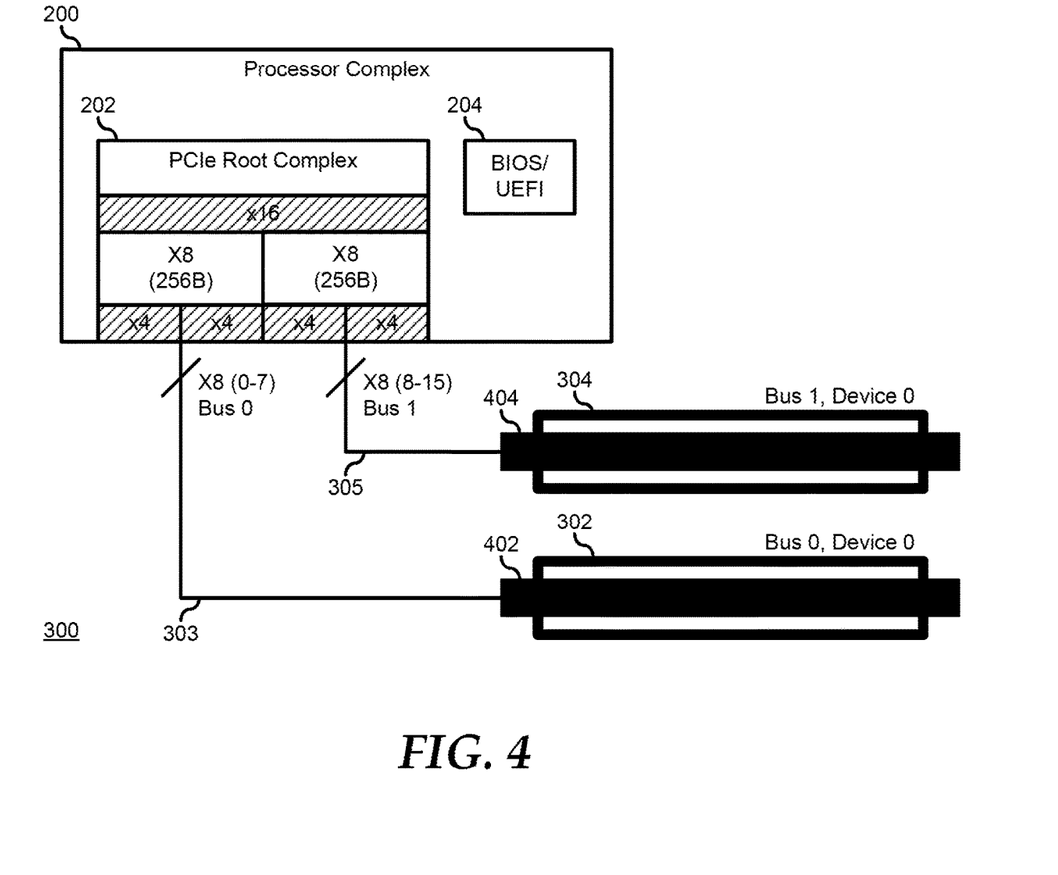
FIGS. 4-6 illustrate the information handling system of FIG. 3 in various configurations according to embodiments of the present disclosure.

FIG. 4 illustrates information handling system 300 configured with a x8 PCIe add-in card 402 populated in x8 PCIe connector 302, and with a x8 PCIe add-in card 404 populated in x8 PCIe connector 304. Here, during a system boot process, BIOS/UEFI 204 ascribes PCIe interface 303 as "Bus 0," and ascribes PCIe interface 305 as "Bus 1," as described above. Further, BIOS/UEFI 204 determines that x8 PCIe add-in card 402 is populated in PCIe connector 302 and that x8 PCIe add-in card 404 is populated in PCIe connector 304, and so the BIOS/UEFI ascribes x8 PCIe add-in card 402 as "Bus 0, Device 0," and ascribes x8 PCIe add-in card 404 as "Bus 1, Device 0." BIOS/UEFI 204 allocates the 512 bytes of completion buffer space between the PCIe interfaces 303 and 305, such that each PCIe interface is configured with 256 bytes of completion buffer space. Similarly, BIOS/UEFI 204 allocates the sixteen outstanding non-posted request instances among PCIe interfaces 303 and 305, such that each PCIe interface is configured to support eight outstanding non-posted request instances.

Figure 5:
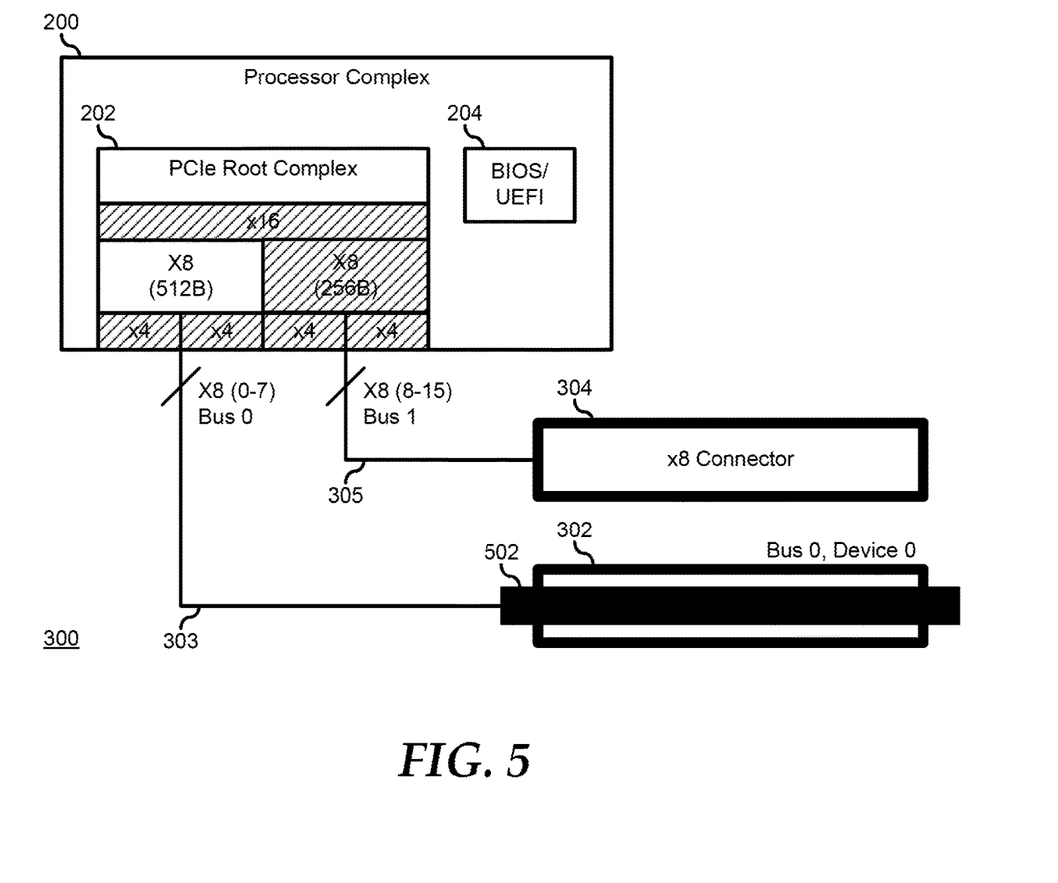

FIG. 5 illustrates information handling system 300 configured with a x8 PCIe add-in card 502 populated in x8 PCIe connector 302, and with no PCIe add-in card populated in x8 PCIe connector 304. Here, during a system boot process, BIOS/UEFI 204 ascribes PCIe interface 303 as "Bus 0," and ascribes PCIe interface 305 as "Bus 1," as described above. Further, BIOS/UEFI 204 determines that x8 PCIe add-in card 502 is populated in PCIe connector 302 and that no PCIe add-in card is populated in PCIe connector 304, and so the BIOS/UEFI ascribes x8 PCIe add-in card 502 as "Bus 0, Device 0," and ascribes no device number to PCIe interface 305. Here, when BIOS/UEFI 204 determines that one of the two x8 PCIe connectors 302 and 304 is populated, and that the adjacent x8 PCIe connector is not populated, then the BIOS/UEFI operates to allocate all of the 512 bytes of completion buffer space to PCIe interface 303, being the PCIe interface that is associated with the populated x8 PCIe connector, and to allocate all of the sixteen outstanding non-posted request instances to PCIe interface 303. By allocating all 512 bytes of completion buffer space and all sixteen outstanding non-posted request instances to PCIe interface 303, information handling system 300 can experience improved I/O performance on PCIe root complex 202. For example, where a PCIe add-in card is a high-speed, low-latency device, the added completion buffer space and outstanding non-posted request instances may permit the PCIe add-in card to operate at full capacity for longer durations without stalling for full completion buffer conditions or excessive outstanding non-posted request conditions, than would otherwise be the case when unused completion buffer space and outstanding non-posted request instances remain allocated to unused PCIe interfaces.

Figure 6:
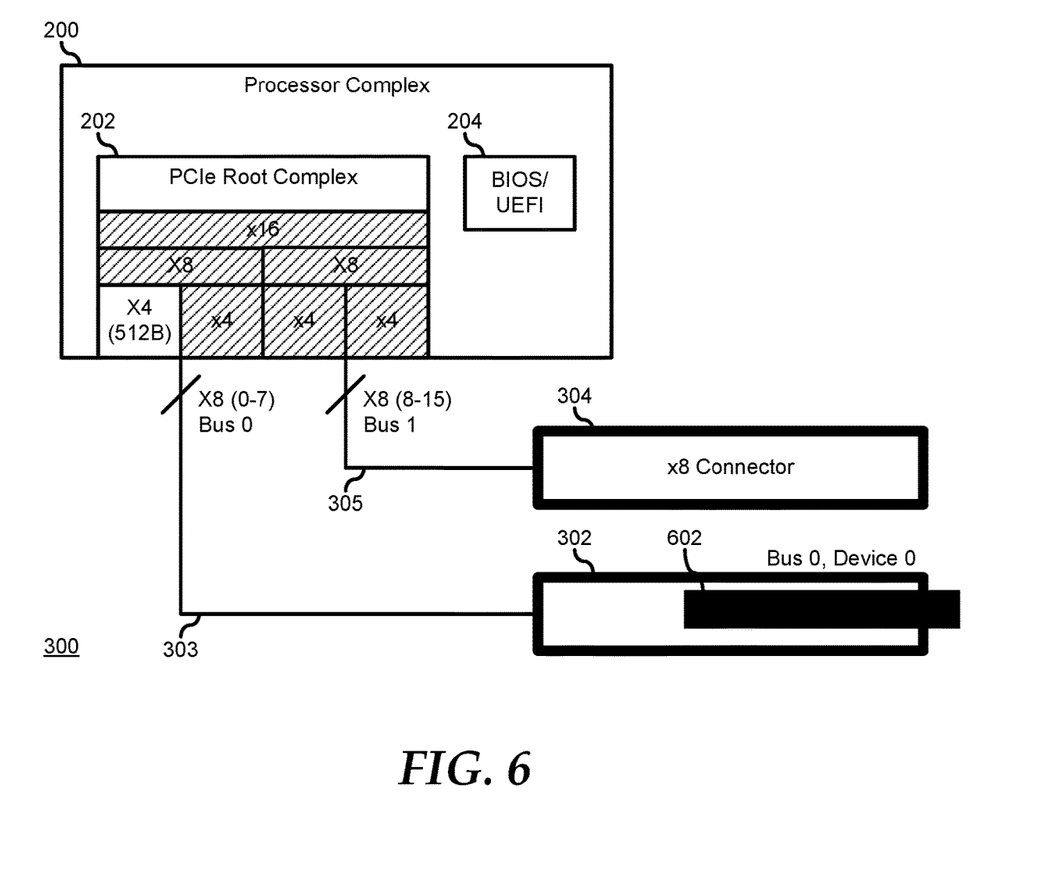

FIG. 6 illustrates information handling system 300 configured with a x4 PCIe add-in card 602 populated in x8 PCIe connector 302, and with no PCIe add-in card populated in x8 PCIe connector 304. Here, during a system boot process, BIOS/UEFI 204 ascribes PCIe interface 303 as "Bus 0," and ascribes PCIe interface 305 as "Bus 1," as described above. Further, BIOS/UEFI 204 determines that x4 PCIe add-in card 602 is populated in PCIe connector 302 and that no PCIe add-in card is populated in PCIe connector 304, and so the BIOS/UEFI ascribes x4 PCIe add-in card 602 as "Bus 0, Device 0," and ascribes no device number to PCIe interface 305. Here, when BIOS/UEFI 204 determines that one of the two x8 PCIe connectors 302 and 304 is populated with x4 PCIe add-in card 602, and that the adjacent x8 PCIe connector is not populated, then the BIOS/UEFI operates to allocate all of the 512 bytes of completion buffer space to PCIe interface 303, being the PCIe interface that is associated with the populated x8 PCIe connector, and to allocate all of the sixteen outstanding non-posted request instances to PCIe interface 303.

In a particular embodiment, an information handling system can flexibly allocate resources from unpopulated PCIe interfaces to the populated PCIe interfaces. For example, where the information handling system includes one or more PCIe devices on a motherboard of the information handling system that are connected to a particular PCIe root complex, and also includes one or more PCIe connectors that are also connected to the PCIe root complex, then the unused completion buffer space and outstanding non-posted request instances of any unpopulated PCIe connectors can be allocated to one or more of the PCIe devices, as needed or desired. Thus, it will be understood that the unused completion buffer space and outstanding non-posted request instances does not necessarily need to be allocated to an adjacent PCIe device or populated PCIe connector, but the unused resources may be allocated where they are most needed. In a particular embodiment, a system BIOS/UEFI can ascribe a priority and limits to the reallocation of the unused resources. For example, a particular x4 PCIe devices may be ascribed a top priority for receiving allocation of the unused resources, but may also have an ascribed upper limit to how much of the unused resources are allocated to it. Thus, a x4 PCIe device may be given a top priority for receiving allocation of the unused resources, but may have a limit of 256 bytes of unused completion buffer space and of eight outstanding non-posted request instances, even if more unused completion buffer space and outstanding non-posted request instances are available. In this case, additional unused resources may then be available to a second priority PCIe device. In a particular embodiment, the priorities and limits can be predetermined for the information handling system, and can be implemented by the system BIOS/UEFI. In another embodiment, a user interface, such as a BIOS set-up screen, permits a user of the information handling system to manually direct the allocation of unused resources.

Figure 7:
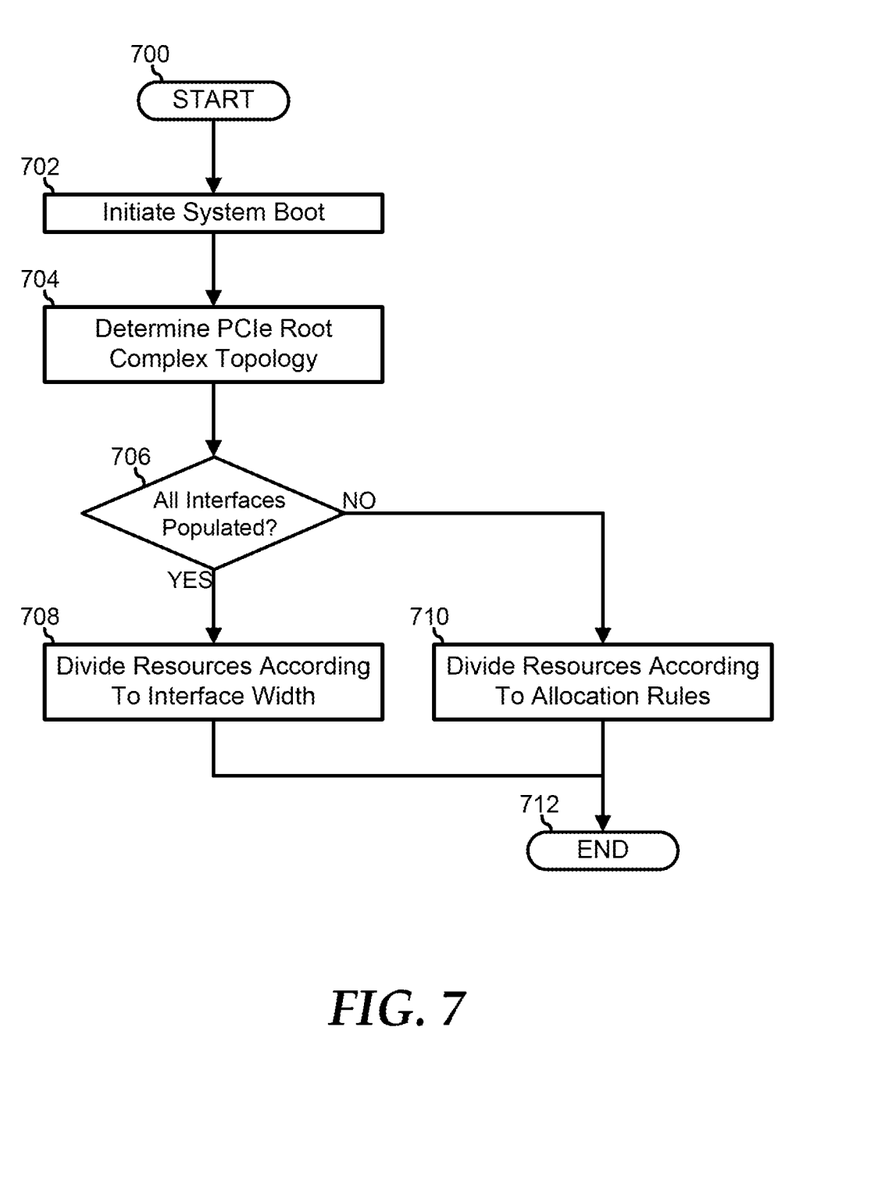
FIG. 7 is a flowchart illustrating a method of providing I/O resource management in an information handling system according to an embodiment of the present disclosure.

FIG. 7 is illustrates a method of providing I/O resource management in an information handling system, starting at block 700. A system boot process is initiated on an information handling system in block 702. For example, a BIOS/UEFI can execute a system boot process. In the course of the system boot process, the topology of one or more PCIe root complexes is discovered on the information handling system in block 704. A determination is made as to whether or not all PCIe interfaces are populated on the information handling system in decision block 706. If so, the "YES" branch of decision block 708 is taken, the resources, such as the completion buffer space and the outstanding non-posted request instances, are allocated to the PCIe interfaces in accordance with each PCIe interface's width, and the method ends in block 712. If all PCIe interfaces are not populated on the information handling system, the "NO"

branch of decision block 708 is taken, the resources are allocated to the PCIe interfaces in accordance with allocation rules implemented by the system BIOS/UEFI, and the method ends in block 712.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   a processor complex including a Peripheral Component Interconnect-Express (PCIe) root complex that provides N serial data lanes, where N is an integer; and
   boot process logic configured to enumerate the root complex during a system boot process for the information handling system, wherein in enumerating the root complex the boot process logic:
   determines that a device is coupled to X of the serial data lanes, where X is an integer less than N;
   determines that no device is coupled to Y of the serial data lanes, where Y is an integer less than or equal to N−X; and
   allocates a portion of bus resources of the root complex to the device, the portion being greater than or equal to (X+Y)/N.

2. The information handling system of claim 1, wherein N is equal to sixteen.

3. The information handling system of claim 2, wherein the portion of the bus resources comprise an amount of completion buffer space.

4. The information handling system of claim 3, wherein the completion buffer space comprises register space within the root complex.

5. The information handling system of claim 3, wherein the amount of completion buffer space is equal to 512 bytes.

6. The information handling system of claim 2, wherein the portion of the bus resources comprise a number of outstanding non-posted requests.

7. The information handling system of claim 6, wherein the number of outstanding non-posted requests is equal to sixteen.

8. The information handling system of claim 1, wherein the boot process logic comprises a system Basic Input/Output System (BIOS).

9. The information handling system of claim 1, wherein the boot process logic comprises a system Universal Extensible Firmware Interface (UEFI).

10. A method, comprising:
    providing, on a Peripheral Component Interconnect-Express (PCIe) root complex of a processor complex of an information handling system, N serial data lanes, where N is an integer;
    determining, by boot process logic of the information handling system configured to enumerate the root complex during a system boot process for the information handling system, that a device is coupled to X of the serial data lanes, where X is an integer less than N;
    determining, by the boot process logic, that no device is coupled to Y of the serial data lanes, where Y is an integer less than or equal to N−X; and
    allocating, by the boot process logic, a portion of bus resources of the root complex to the device, the portion being greater than or equal to (X+Y)/N.

11. The method of claim 10, wherein N is equal to sixteen.

12. The method of claim 11, wherein the portion of the bus resources comprise an amount of completion buffer space.

13. The method of claim 12, wherein the completion buffer space comprises register space within the root complex.

14. The method of claim 13, wherein the amount of completion buffer space is equal to 512 bytes.

15. The method of claim 11, wherein the portion of the bus resources comprise a number of outstanding non-posted requests.

16. The method of claim 15, wherein the number of outstanding non-posted requests is equal to sixteen.

17. The method of claim 10, wherein the boot process logic comprises one of a system Basic Input/Output System (BIOS) and a system Universal Extensible Firmware Interface (UEFI).

18. An information handling system, comprising:
    a processor complex including a Peripheral Component Interconnect-Express (PCIe) root complex that provides N serial data lanes, where N is an integer; and
    boot process logic configured to enumerate the root complex during a system boot process for the information handling system, wherein in enumerating the root complex the boot process logic:
    determines that a first device is coupled to X of the serial data lanes, where X is an integer less than N;
    allocates a first portion of bus resources to the first device, the first portion being X/N of a total amount of bus resources of the root complex;
    determines that a second device is coupled to Y of the serial data lanes, where Y is an integer less than X−N;
    determines that no device is coupled to Z of the serial data lanes, where Z is a non-zero integer less than or equal to N−X−Y; and allocates a portion of bus resources of the root complex to the device, the portion being greater than or equal to (Y+Z)/N.

19. The information handling system of claim 18, wherein the portion of the bus resources comprise an amount of completion buffer space.

20. The information handling system of claim 18, wherein the portion of the bus resources comprise a number of outstanding non-posted requests.

* * * * *